April 21, 1964 D. A. VENN ETAL 3,130,297

DIGITAL CLOCK SYSTEM

Filed Nov. 6, 1961 2 Sheets-Sheet 1

INVENTORS
DOUGLAS A. VENN
DONALD H. JONES

BY Glenn S Dvorak Agent
Richard Reed
ATTORNEY

April 21, 1964 D. A. VENN ETAL 3,130,297

DIGITAL CLOCK SYSTEM

Filed Nov. 6, 1961 2 Sheets-Sheet 2

INVENTORS
DOUGLAS A. VENN
DONALD H. JONES

BY Glenn S. Ovrevik Agent
Richard Reed
ATTORNEY

United States Patent Office 3,130,297
Patented Apr. 21, 1964

3,130,297
DIGITAL CLOCK SYSTEM
Douglas A. Venn, Suitland, Md., and Donald H. Jones, Washington, D.C., assignors to the United States of America as represented by the Secretary of the Navy
Filed Nov. 6, 1961, Ser. No. 150,603
5 Claims. (Cl. 235—92)
(Granted under Title 35, U.S. Code (1952), sec. 266)

The invention described herein may be manufactured and used by or for the Government of the United States of America for governmental purposes without the payment of any royalties thereon or therefor.

This invention relates in general to time event control systems and in particular to such systems of the digital clock variety having high precision reliability.

Control of rapid, closely timed operational events presents a problem of increasing importance in many scientific fields. In space exploration and investigation, for example, timing is vitally important to navigational control of high velocity space vehicles. Frequently, continuous time information, such as elapsed time or time of day, is required for proper programming operation. Since time is a relative quantity it is essential to such systems, for purposes of synchronization, that a reference time base be employed. Often the reference time base is obtained from a recognized standard frequency source such as the U.S. Naval Radio Station NBA, Balboa, Canal Zone, which continuously broadcasts accurate time signals as determined by the U.S. Naval Observatory.

Generally a standard frequency source at the remote location is synchronized with the output of radio station NBA or the like, and the output of the synchronized source is converted into binary or digital information whereupon it is compared with compatible binary or digital coded program information and equipment is actuated upon an attainment of a predetermined relationship between the two. It will be seen that the complexities involved in the conversion of the synchronized source information and the subsequent comparison of information are likely to introduce problems of reliability which affects performance to a varying degree in different applications. Accordingly;

It is an object of this invention to provide an electronic counter circuitry with a high degree of inherent reliability.

It is another object of this invention to provide an electronic counter circuitry which affords prompt indication of a defective component.

Other objects of this invention will become apparent upon a more comprehensive understanding of the invention for which reference is had to the following specification and drawings, wherein.

Figure 1:
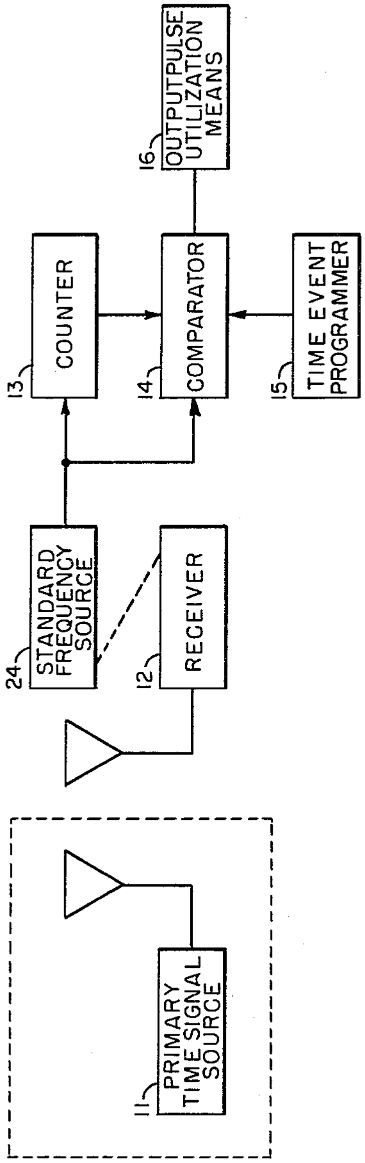
FIG. 1 is a block diagram of a typical time control system for use in remote applications.

Briefly, the device of this invention is a digital clock system which utilizes a plurality of active electronic counters, all of which are continuously operative and continuously monitored; a digital programmer; digital information comparison means; and means for comparing the outputs of said counters and said programmer in said comparison means.

Referring now to the drawings:

In the system of FIG. 1, which is typical of the prior art, a reference time signal is transmitted by Primary Time Signal Source 11 at a selected frequency and is received by receiver 12.

Standard frequency source 24, which is adapted for manual or automatic synchronization in accordance with the signal received by receiver 12, is connected to counter 13 and to comparator 14. Counter 13 converts pulse information into digital form and the output of the counter 13 is applied, along with the digital output of time event programmer 15, to the gating portion of comparator 14. Comparator 14 is adapted to pass the output of receiver 12 to output pulse utilization means 16 when the content of pulse information in the outputs of counter 13 and the programmer 15 are in a selected relation, usually when they are electrically identical.

Figure 2:
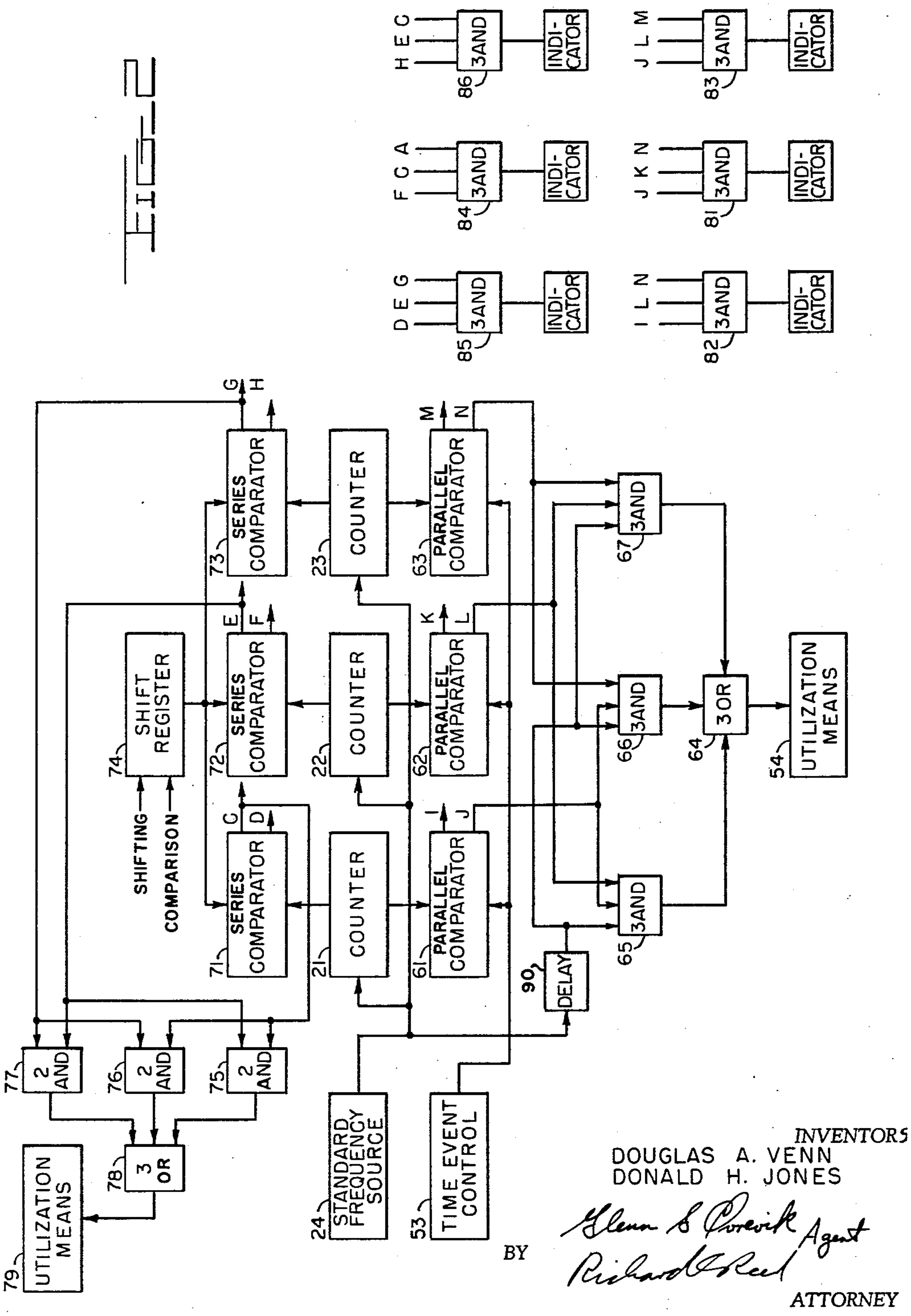
FIG. 2 is a block diagram of one embodiment of the time event control system of this invention.

The embodiment of FIG. 2, accomplishes the same end result as the embodiment of FIG. 1 but does so with a greater degree of reliability. In FIG. 2, the counters 21, 22 and 23 are connected to an oscillator, such as standard frequency source 24, which may be synchronized with the output of the primary time signal source by means not shown, such that each counts in accordance with the output of the source 24.

If the counters 21, 22 and 23 are capable of processing 12 digit information, that is, if the counters are capable of counting to $10^{12}$, the binary coded decimal (BCD) output will contain 48 bits, since each decimal digit requires 4 bits in the standard 1—2—4—8 form. For ease of illustration, the connections between counters 21, 22 and 23 and the parallel comparators 61, 62 and 63 are shown as a single line, although it should be recognized that a multiplicity of connections is intended, such as 96 lines for the above described 12 digit system, 48 lines being for the real information and 48 lines complementing the real information. Similarly, the single line joining the time event control means 53 to the parallel comparators 61, 62 and 63 is representative of a multiplicity of connections. In a 12 digit system, the single line is representative of 96 connections.

It is to be noted that in parallel comparison it is desirable to compare both energy levels for each information bit, or in other words, to have a "2 AND" gate for comparison of the energized state and a "2 AND" gate for comparison of the unenergized level of each information bit.

Upon the attainment of a selected relationship between the BCD output of counters 21, 22 and 23 and the output of time event control 53, the parallel comparators 61, 62 and 63 will generate an output, for example a pulse. If identical similarity is the selected relationship, in a 12 digit system, the parallel comparators 61, 62 and 63 could each take the form of 96 "2 AND" gates feeding into a single "96 AND" gate. In such an arrangement, the comparators 61, 62 and 63 will produce a pulsed output when the 48 bit output of counters 21, 22 and 23 is identically the same as the 48 bit output of the time event control 53.

The output of each of the parallel comparators 61, 62 and 63 is connected to the input of "3 OR" gate 64 via two of the "3 AND" gates 65, 66 and 67 and the third input of each of the "3 AND" gates 65, 66 and 67 is connected to the output of the source 24. Thus when each bit counter is functioning properly each of the "3 AND" gates affords an output which is applied to its respective input of "3 OR" gate 64 which in turn activates the output utilization means 54.

To obtain precise coincidence of the three inputs to the gates 65, 66 and 67, the delay means 90 may be inserted into the connection between these gates and the source 24 to compensate for the slight delays which occur in the counters and comparators.

It will be appreciated that the circuitry of FIG. 2 described above, the output of any combination of two or more properly functioning counters 21, 22 and 23 will activate the output utilization means 54. As will be discussed hereinafter, simple indicators connected to the output of each of the parallel comparators may be adapted to signal an alert in the absence of an output.

The counters 21, 22 and 23 are also connected to serial comparators 71, 72 and 73. Since serial comparison is a slower process than parallel comparison and because the typical serial utilization means 79 does not usually require the high degree of precision demanded by utilization means 54, it is usually sufficient to compare only the BCD bit output of the counters 21, 22 and 23 relating to the more significant digits. For example, in a 12 digit system, the four least significant digits might be disregarded and the comparators 71, 72 and 73 connected to receive the 32 bit information relating to the other 8 larger digits. In this case, the single line joining the counters and the serial comparators is representative of 32 connections. It is to be noted that in serial comparison complementary information from the counters is not used since the function of the serial comparator is to convert the information from parallel to serial form.

The shift register 74 is also connected to each of the serial comparators 71, 72 and 73 by the same number of connections, for example 32, as join the serial comparators to the counters 21, 22 and 23. The shift register 74, which is well known and of conventional design, is energized by a comparison input which inserts a single pulse into the shift register at a frequency which determines the frequency of serial comparison and a shifting frequency input which shifts the pulse to the various outputs of the register. If, for example, shift register 74 is connected to serial comparators 71, 72 and 73 by 32 connections, if the frequency of comparison is 1000 times a second, that is the comparison input frequency is 1 kc. and if the shifting frequency is 100 kc., the following sequence will occur. At time zero the output of shift register 74 is blank but a 1 kc. comparison pulse is inserted. At time equal .00001 second, the register output can be symbolized as 1000000 . . . (32 bits) and at time equal .00014 second, the register output is 00000000000000010000 . . . (32 bits)

The serial comparators 71, 72 and 73 can, for example, each take the form of 32 "2 AND" gates, each connected to the shift register and to a counter and feeding into a single "32 OR" gate. It is apparent, then, that the 1 kc. pulse is swept by the 100 kc. shifting frequency and thus causes the serial comparators 71, 72 and 73 to read out, in serial form, 1000 times a second the 32 bit information from the counters 21, 22 and 23. These read outs from the serial comparators are connected to 3 "2 AND" gates 75, 76 and 77 in such a manner that the output of two or more properly functioning bit counters will activate the output utilization means 79 via the "3 OR" gate 78. As will become hereinafter apparent, simple indicators are connected to the serial comparators 71, 72 and 73 to signal an alert in the absence of a comparator output.

It will be noted that each of the serial comparators 71, 72 and 73 and each of the parallel comparators 61, 62 and 63 includes a second output connection. This provides a complementary output in each case, that is, an alternate output which is, for example, opposite in sign with respect to the first output. Each of the comparator output connections is connected as indicated by letter identification, for purposes of simplification, to "3 AND" gates in the plurality 81–86 which are adapted to activate respective indicators, when all three inputs are energized. Each of the "3 AND" gates 81–83 is connected to the complementary output of one of the parallel comparators 61, 62 and 63 and to the primary or real output of the other two parallel comparators.

When a defect occurs in any counter-parallel comparator channel the "3 AND" gate in the 81–83 plurality thereof with an input connected to the respective complementary output will activate the indicator. That is, the defect will be detected by activation of the indicator upon the first parallel comparator output following the occurrence of the defect.

The "3 AND" gates 84–86 are connected in similar fashion to a complementary output of one of the series comparators 71, 72 and 73 and to the primary output of the other series comparators. When a defect occurs in any counter, the "3 AND" gate with an input connected to the respective complementary output will activate the indicator. Thus, the defect will be detected promptly upon the occurrence of the defect and quicker remedial action may be taken.

Furthermore, it will be seen that the combination of "3 AND" gates 81–83 and 84–86 serves to isolate the circuit difficulty by vindication of the respective counter or comparator when only the "3 AND" gates 81–83 or the "3 AND" gates 84–86 alert.

The invention will now be described in a specific shipboard environment wherein utilization means 54 triggers the Captain's alarm clock and utilization means 79 displays the time of day. Of course, more sophisticated uses will occur to persons skilled in the military and commercial instrumentation arts.

By means which are not part of this invention, and could be similar to the apparatus shown in FIG. 1, the counters 21, 22 and 23 can be controlled to start counting at precisely midnight. The standard frequency source 24 furnishes pulses at a 1 mc. frequency, thus one minute after midnight the counters 21, 22 and 23 will each have received 60 million pulses from source 24. During the course of a 24 hour cycle, device 24 will supply the counters with $24 \times 60 \times 60 \times 10^6$ or 86,400,000,000 pulses, this being an 11 digit number. If the counters 21, 22 and 23 are capable of processing 12 digit information, it can be seen that the invention can be operated on a two day cycle, if desired.

Time event control or programmer 53 can be selectively adjusted to command triggering of the Captain's alarm clock, say at 0600 hours. When the 48 bit BCD output of the counters 21, 22 and 23 is identically similar to the 48 bit coded command output of the time event control or programmer 53, that is the 0600 hour command, the parallel comparators 61, 62 and 63 will trigger the utilization means or alarm clock 54 through the "3 AND" gates 65, 66 and 67 and the "3 OR" gate 64. The triggering will occur within an accuracy of one microsecond of the time commanded by the time event control 53, even if one of the counter-parallel comparator channels is inoperative. The defective channel, which fails to contribute, will be identified by the indicators associated with AND gates 81, 82 and 83.

For most purposes, knowledge of the time of day to an accuracy of a millisecond is sufficient. Therefore, only the 8 digits, that is, the 32 bit BCD output of counters 21, 22 and 23 relating to periods of a millisecond or longer in a 24 hour day are connected to the serial comparators 71, 72 and 73. If the shift register 74 is energized by a 1 kc. comparison input and by a 100 kc. shifting input, the utilization means 79 will receive BCD count information relating to millisecond time 1000 times a second and will utilize this information to display the time of day to an accuracy of a millisecond. This will occur even if one of the counter-serial comparator channels becomes inoperative, which event will be immediately signalled by indicators associated with AND gates 84, 85 and 86.

It will be seen, also, that the device may be adapted to include more than three counters, if greater reliability is desired and that in such adaptions, the additional counters may be connected in counting standby assembly with an accompanying increase in comparator and transfer means circuitry or in a non-counting standby arrangement with conventional means, not shown, for direct substitution of the noncounting standby unit in place of the defective unit after changeover.

Finally, it is understood that this invention is to be limited only by the scope of the claims appended hereto.

What is claimed is:

1. A digital clock system comprising a time information source; a plurality of substantially identical bit counters, each of said bit counters connected to said source to count the output thereof; at least one coded bit programmer means, at least one plurality of signal comparator means, each comparator means connected to compare the output of a respective bit counter in said plurality thereof and the output of said programmer means; at least one plurality of gating means of the "AND" variety, each of said gating means of the "AND" variety having input connections to at least two of said comparators in said plurality thereof, at least one gating means of the "OR" variety, the inputs of said gating means of the "OR" variety connected to the outputs of said gating means of the "AND" variety in said plurality thereof, and means for utilizing the output of said gating means of the "OR" variety.

2. A digital clock system comprising a time information source; a plurality of substantially identical bit counters, each of said bit counters connected to said source to count the output thereof; first and second coded bit programmer means; first and second pluralities of signal comparator means, each comparator means connected to compare the outputs of a respective bit counter and the output of said first or second programmer means, first and second pluralities of gating means of the "AND" variety, each of said gating means of the "AND" variety having input connections to at least two of said comparators in its respective plurality thereof, first and second gating means of the "OR" variety, the inputs of each of said gating means of the "OR" variety connected to the outputs of said gating means of the "AND" variety in said first and second pluralities, respectively, and first and second means for utilization of the outputs of said first and second gating means of the "OR" variety, respectively.

3. The digital clock system as defined in claim 2 wherein said pulse signal comparator means in said first and second pluralities thereof are adapted for parallel comparison and for series comparison, respectively.

4. The digital clock system as defined in claim 3 wherein each of said gating means of the "AND" variety in said first plurality thereof have an input connection to said source.

5. The digital clock system as defined in claim 4 wherein said second programmer means is a shift register.

References Cited in the file of this patent

UNITED STATES PATENTS

| | | |
|---|---|---|
| 2,785,856 | Hobbs | Mar. 19, 1957 |
| 2,798,216 | Goldberg et al. | July 2, 1957 |
| 2,842,663 | Eckert et al. | July 8, 1958 |
| 2,884,616 | Fillebrown et al. | Apr. 28, 1959 |
| 2,897,480 | Kumagai | July 28, 1959 |
| 2,907,003 | Hobbs | Sept. 29, 1959 |
| 2,919,854 | Singman | Jan. 5, 1960 |
| 2,996,248 | Abbot | Aug. 15, 1961 |